United States Patent [19]

Glasrud et al.

[11] Patent Number: 4,529,061
[45] Date of Patent: Jul. 16, 1985

[54] FLUID LEVEL CONTROL SYSTEM

[75] Inventors: Peder A. Glasrud, Waterloo; Thomas M. Sullivan, Cedar Falls, both of Iowa

[73] Assignee: Deere & Company, Moline, Ill.

[21] Appl. No.: 573,235

[22] Filed: Jan. 23, 1984

[51] Int. Cl.³ .......................... F16H 1/44; F01M 1/08
[52] U.S. Cl. .................. 184/103 R; 74/467; 74/710; 184/6.12
[58] Field of Search .......... 184/103 R, 6.12; 74/467, 710

[56] References Cited

U.S. PATENT DOCUMENTS

| | | | |
|---|---|---|---|
| 2,617,495 | 11/1952 | Johnson | 184/103 R |
| 3,241,746 | 3/1966 | Shaw | 184/103 R X |
| 3,458,011 | 7/1969 | Dwyer | 184/103 R |
| 3,862,672 | 1/1975 | Tappen et al. | 184/6.12 |
| 3,913,414 | 10/1975 | Freiburger | 74/710 X |
| 4,235,307 | 11/1980 | Browning et al. | 74/467 X |
| 4,352,301 | 10/1982 | Fleury | 74/710 X |

Primary Examiner—David H. Brown

[57] ABSTRACT

A fluid level control system is disclosed which uses pressurized air from a turbocharged engine to regulate the level of fluid in an axle assembly and for returning excess fluid from the axle assembly to a transmission case. The system includes a fluid supply line and a fluid return line connecting the transmission case to the axle assembly. A pump is positioned across the fluid supply line to supply pressurized fluid to a hydraulic actuator which is located within the axle assembly. The hydraulic actuator, such as a clutch for a differential, is susceptible to leaking fluid which can raise the fluid level in the axle assembly. A standpipe is positioned within the axle assembly and has a first end connected to the return line and a second open end located approximately even with a predetermined static fluid level. The system also includes an air intake line connecting the turbocharger to the axle assembly and has an orifice positioned thereacross for limiting the rate of flow of pressurized air which is directed therethrough. The orifice also assures that the efficient performance of the turbocharger is not detrimentally affected. In order to assure that any excess fluid within the axle assembly is routed to the transmission case, the pressurized air must be of sufficient value to overcome any head difference present between the fluid level at the second end of the standpipe and the outlet of the return line. There should also be sufficient air pressure to overcome any restrictions which may exist in or across the return line.

9 Claims, 1 Drawing Figure

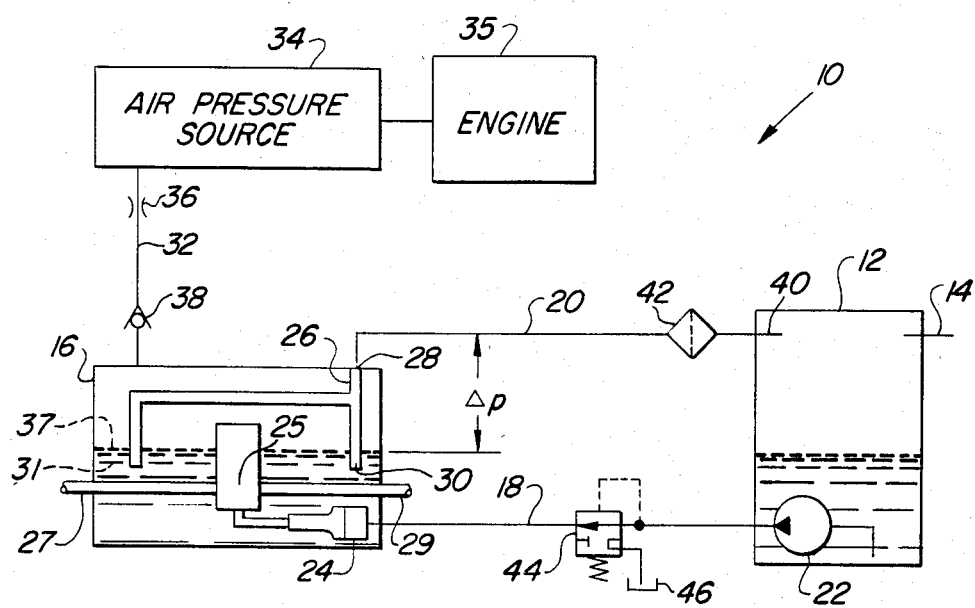

FLUID LEVEL CONTROL SYSTEM

FIELD OF THE INVENTION

This invention relates to a fluid level control system which uses pressurized air from a turbocharger to regulate the level of fluid in an axle assembly and for returning excess fluid from the axle assembly to a transmission case.

BACKGROUND OF THE INVENTION

For many off road type vehicles such as agricultural or industrial tractors, it is conventional to cool the oil which is used to lubricate the axle assembly. One method of cooling this oil is to recirculate the oil between the transmission case and the axle assembly such that the warm oil is able to intermix with a larger quantity of cooler oil before being returned to the axle assembly. In addition to maintaining a certain level within the axle assembly, it is normal to have a hydraulic actuator such as a differential clutch located within the axle assembly. When the clutch is engaged, the differential is locked up and both axles are driven as one and when the clutch is released, both axles can be driven independently. Such hydraulic actuators are susceptible to leaking fluid at various joints or seals during operation and this leaked oil can increase the oil level within the axle assembly. This presents a problem in that as the oil level increases, the efficiency of the axle decreases, greater cavitation can occur, and a larger quantity of oil is heated which can result in overheating of the axle assembly.

Various attempts to correct this problem have run the gamut of operating the axle assembly completely full of oil to using complex seals to prevent leakage. The first option is not feasible for any vehicle which requires a full speed range and the second option has proven costly as well as not being completely satisfactory.

Now a fluid level control system has been invented which solves the above-identified problems in an efficient and economical manner.

SUMMARY OF THE INVENTION

Briefly, this invention relates to a fluid level control system which uses pressurized air from a turbocharger to regulate the level of fluid in an axle assembly and for returning excess fluid from the axle assembly to a transmission case. The system includes a fluid supply line and a fluid return line connected between the transmission case and the axle assembly for circulating oil therebetween. A pump is connected across the fluid line for supplying pressurized fluid to a hydraulic actuator which is positioned within the axle assembly. This hydraulic actuator is susceptible to leaking fluid which can raise the level within the axle assembly. A standpipe is positioned within the axle assembly and has one end connected to the return line and a second open end located approximately even with a predetermined static fluid level. The system also includes an air intake line which connects the turbocharger to the axle assembly and an orifice positioned thereacross for limiting the rate of flow of pressurized air which can be directed to the axle assembly. The pressurized air is of a sufficient value to overcome any head difference between the fluid level at the second end of the standpipe and the outlet of the return line as well as for overcoming any restrictions in the return line. This fluid level control system assures that as the oil level increases above a predetermined static fluid level within the axle assembly, that the fluid can be recirculated to the transmission case to be cooled.

The general object of this invention is to provide a fluid level control system which uses pressurized air to regulate the level of fluid in a first chamber and to return excess fluid to a second chamber. A more specific object of this invention is to use pressurized air from a turbocharger to regulate the fluid level in an axle assembly.

Another object of this invention is to provide cool lubricating oil to an axle assembly by using pressurized air from a turbocharger while only negligably affecting the efficiency of the turbocharger.

A further object of this invention is to provide a fluid level control system which is simple in construction and economical to use.

Still further, an object of this invention is to provide a fluid level control system which will assure that excess oil will be returned to a cooling chamber should hydraulic leakage be present within the axle assembly.

Other objects and advantages of the present invention will become more apparent to those skilled in the art in view of the following description and the accompanying drawing.

BRIEF DESCRIPTION OF THE DRAWING

The drawing is a flow diagram of the various elements associated with the fluid level control system.

DETAILED DESCRIPTION OF THE PREFERRED EMBODIMENT

Referring to the drawing, a fluid level control system 10 is shown which can be utilized on off road equipment such as agricultural and industrial tractors or crawlers. It should also be noted that the fluid level control system 10 can easily be incorporated into stationary engines which incorporate drive mechanisms for rotating a drive shaft. The fluid level control system 10 includes a transmission case 12 which is vented to the atmosphere by a vent line 14. The transmission case 12 is connected to an axle assembly 16 by a fluid supply line 18 and by a return line 20. A pump 22 is positioned across the supply line 18 for supplying pressurized fluid to a hydraulic actuator 24 located within the axle assembly 16. The hydraulic actuator 24 can be a multiple disc clutch which is selectively engageable and disengageable to activate a differential 25. When the clutch is engaged, the differential is locked up and both left and right axles, 27 and 29 respectively, associated with either the front or rear of the vehicle can be driven as one. When the clutch is disengaged or released, the left and right axles 27 and 29 can be driven independently thereby enabling the vehicle to make a turn. An example of such a clutch and the hydraulic connections associated therewith are shown in U.S. Pat. No. 3,913,414, issued to Freiburger on Oct. 21, 1975, and entitled "Differential Structure for Preventing Leakage of Differential Lock Actuating Fluid to the Differential Housing".

The hydraulic actuator 24 is susceptible to leaking fluid especially during operation and this leaked fluid can raise the level within the axle assembly 16. For efficient operation of a vehicle, the static fluid level within the axle assembly 16 should be set approximate the horizontal centerline of the axle assembly 16. As the oil level increases above this predetermined level, the efficiency of the axle assembly 16 decreases due to the fact that the gears in the differential 25 have to move a greater quantity of oil as they rotate. Furthermore, the excess oil will result in increased cavitation and in the generation of a greater quantity of heat within the axle assembly 16.

A standpipe 26 is also positioned in the axle assembly 16 and is connected at a first end 28 to the return line 20 and has a second open end 30 which is located approximately even with a predetermined static fluid level 31 in the axle assembly 16.

The fluid level control system 10 further includes an air intake line 32 which connects a source of pressurized air 34, for example a turbocharger, which is associated with an engine 35. Positioned across the air intake line 32 is an orifice 36. This orifice 36 limits the rate of flow of pressurized air which can be drawn from the turbocharger 34, without decreasing its efficiency by more than one percent. Preferably, the efficiency of the turbocharger 34 is not decreased by more than 0.5 percent, and most preferably by no more than 0.1 percent.

It should be noted that other types of valving mechanisms can be substituted for the orifice 36. In addition, it should be noted that the orifice 36 can be either a fixed or variable orifice. The size of the orifice 36 is adjusted to assure that a rate of air flow at a sufficient pressure, is directed into the axle assembly 16. The pressurized air should be sufficient to cause any excess fluid above a predetermined working level 37 to be routed through the standpipe 26 and the return line 20 to the transmission case 12. As is known to those skilled in this art, the predetermined working level 37 will be slightly higher than the static fluid level 31 due to cavitation and oil splashing.

Also positioned across the air intake line 32 and downstream of the orifice 36 is a one-way check valve 38 which is preferably a spring loaded check ball. The check valve 38 will open as pressurized air is routed from the turbocharger 34 into the axle assembly 16 but will close should a situation arise wherein fluid and/or air pressure within the axle assembly 16 rises and tries to flow upwards through the air intake line 32. For example, when the turbocharger 34 is operating at a low boost pressure and the oil is very cold, it is conceivable that the oil level will continue to rise above the predetermined working level 37 since the air pressure will be insufficient to cause it to recirculate back to the transmission case 12. In this case, as the oil level rises within the axle assembly 16, the air pressure trapped therein will increase to the point where it would equalize the air pressure from the turbocharger 34 and therefore keep the check valve 38 closed. As the engine 35 increases its load, the pressure from the turbocharger 34 will increase thereby opening the check valve 38 and causing the excess fluid within the axle assembly 16 to be returned to the transmission case 12. The air pressure directed from the turbocharger 34 should be sufficient to overcome any head difference ($\Delta P$) which is present between the predetermined working level 37 and an outlet opening 40 of the return line 20. The pressurized air in the axle assembly 16 should also be sufficient to overcome any restrictions which may exist in or across the return line 20, such as can be created by a filter 42.

The fluid level control system 10 can also include a relief valve 44 which is positioned across the supply line 18. The relief valve 44 will assure that excess fluid can be returned to a reservoir 46 before any physical damage occurs to the hydraulic actuator 24.

While this invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A fluid level control system which uses pressurized air to regulate the level of fluid in a first chamber and for returning excess fluid from said first chamber to a second chamber, said second chamber being vented to the atmosphere, said system comprising:
   (a) a first line fluidly connecting said second chamber to said first chamber;
   (b) a pump connected across said first line for supplying pressurized fluid to a hydraulic actuator positioned in said first chamber, said hydraulic actuator being susceptible to leaking fluid which can raise the fluid level in said first chamber;
   (c) a second line fluidly connecting said first chamber to said second chamber;
   (d) a standpipe positioned within said first chamber having a first end connected to said second line and a second end located approximately even with a predetermined static fluid level in said first chamber, said second end having an opening formed therein;
   (e) an air intake line connecting a source of pressurized air to said first chamber; and
   (f) means positioned across said air intake line for limiting the rate of flow of pressurized air flowing therethrough, said pressurized air being of a sufficient value to overcome any head difference present between the fluid level at said second end of said standpipe and an outlet of said second line and for overcoming any restrictions in said second line so as to return excess fluid above said predetermined static fluid level from said first chamber to said second chamber.

2. A fluid level control system which uses pressurized air from an engine having a turbocharger associated therewith to regulate the level of fluid in an axle assembly while only negligably affecting the efficient performance of said turbocharger and for returning excess fluid from said axle assembly to a transmission case, said transmission case being vented to the atmosphere, said system comprising:
   (a) a fluid supply line connecting said transmission case to said axle assembly;
   (b) a pump connected across said fluid supply line for supplying pressurized fluid to a hydraulic actuator positioned within said axle assembly, said hydraulic actuator being susceptible to leaking fluid which can raise the fluid level in said axle assembly;
   (c) a fluid return line connecting said axle assembly to said transmission case;
   (d) a standpipe positioned within said axle assembly having a first end connected to said return line and having a second end located approximately even with a predetermined static fluid level in said axle assembly, said second end having an opening formed therein;
   (e) an air intake line connecting said turbocharger to said axle assembly; and
   (f) means positioned across said air intake line for limiting the rate of flow of pressurized air flowing therethrough, said pressurized air being of a sufficient value to overcome any head difference present between the fluid level at said second end of said standpipe and an outlet of said return line and for overcoming any restrictions in said return line so as to return excess fluid above said predetermined static fluid level from said axle assembly to said transmission case.

3. The fluid level control system of claim 2 wherein said means for limiting the rate of flow of pressurized air from said turbocharger to said axle assembly is an orifice which does so without decreasing the operating efficiency of said turbocharger by more than one percent.

4. The fluid level control system of claim 2 wherein said orifice limits the rate of flow of pressurized air directed from said turbocharger to said axle assembly without decreasing the efficiency of said turbocharger by more than 0.5 percent.

5. The fluid level control system of claim 2 wherein said orifice is a fixed orifice which limits the rate of flow of pressurized air directed from said turbocharger to said axle assembly without decreasing the operating efficiency of said turbocharger by more than 0.1 percent.

6. The fluid level control system of claim 2 wherein a one-way check valve is positioned across said air intake line for preventing reverse flow therethrough.

7. In a vehicle having an engine with a turbocharger associated therewith, a transmission vented to the atmosphere and an axle assembly including differential gearing drivingly connected to opposite extending differential output shafts, a fluid level control and leakage return system comprising:
   (a) a fluid supply line connecting said transmission to said axle assembly;
   (b) a pump connected to said supply line for supplying pressurized fluid therethrough to a hydraulic actuator positioned within said axle assembly, said hydraulic actuator being susceptible to leaking fluid which can raise the fluid level in said axle assembly;
   (c) a fluid return line connecting said axle assembly to said transmission;
   (d) a standpipe positioned within said axle assembly having a first end connected to said return line and having a second end located approximately even with a predetermined static fluid level in said axle assembly, said second end having an opening formed therein;
   (e) an air intake line connecting said turbocharged engine to said axle assembly; and
   (f) means positioned across said air intake line for limiting the rate of flow of pressurized air from said turbocharged engine to said axle assembly without decreasing the operating efficiency of said turbocharger by more than one percent, said pressurized air being of a sufficient value to overcome any head difference present between the fluid level at said second end of said standpipe and an outlet of said return line and for overcoming any restrictions in said return line so as to return excess fluid above said predetermined static fluid level from said axle assembly to said transmission case.

8. The fluid control and leakage return system of claim 7 wherein said limiting means is an orifice which limits the rate of flow of pressurized air directed from said turbocharged engine to said axle assembly without decreasing the operating efficiency of said turbocharged engine by more than 0.1 percent.

9. The fluid level control and leakage return system of claim 8 wherein a one-way check valve is positioned across said air intake line and downstream from said orifice for preventing reverse flow therethrough.

* * * * *